United States Patent [19]
Williams et al.

[11] Patent Number: 5,768,784
[45] Date of Patent: Jun. 23, 1998

[54] COATING SYSTEM AND METHOD FOR FILLING OF A HYDRODYNAMIC BEARING AND A SECONDARY SEAL STRUCTURE MADE THEREBY

[75] Inventors: Carl D. Williams, Colorado Springs, Colo.; Shuo-Hao Chen, Freemont, Calif.; Jackie Cordova, Colorado Springs, Colo.

[73] Assignee: Quantum Corporation, Milpitas, Calif.

[21] Appl. No.: 673,534

[22] Filed: Jul. 1, 1996

Related U.S. Application Data

[62] Division of Ser. No. 437,995, May 9, 1995, abandoned.

[51] Int. Cl.[6] .................................................. F16C 33/00
[52] U.S. Cl. .................. 29/898.12; 29/898.1; 29/898.02; 29/458; 29/527.2; 29/530; 384/100; 427/348; 427/384
[58] Field of Search ............................. 29/898.12, 898.1, 29/898.11, 898.02, 458, 527.1, 527.2, 530; 427/384, 348; 384/100, 119, 124, 130, 132, 108

[56] References Cited

U.S. PATENT DOCUMENTS

| | | | |
|---|---|---|---|
| 3,500,525 | 3/1970 | Glenn | 29/898.1 |
| 4,445,793 | 5/1984 | Shinohara | 384/130 |
| 4,795,275 | 1/1989 | Titcomb et al. | 384/107 |
| 4,928,376 | 5/1990 | Poglitsch | 29/530 |
| 5,067,528 | 11/1991 | Titcomb et al. | 141/4 |
| 5,112,142 | 5/1992 | Titcomb et al. | 384/107 |
| 5,284,391 | 2/1994 | Diel et al. | 384/108 |
| 5,373,635 | 12/1994 | Nonaka et al. | 29/898.1 |
| 5,427,456 | 6/1995 | Hensel | 384/112 |
| 5,484,212 | 1/1996 | Guaraldi et al. | 29/898.1 |
| 5,564,188 | 10/1996 | Akasako et al. | 29/898.12 |

*Primary Examiner*—Larry I. Schwartz
*Assistant Examiner*—Marc W. Butler
*Attorney, Agent, or Firm*—John C. Chen; William J. Kubida

[57] ABSTRACT

A coating system and method for facilitating the cleaning of hydrodynamic bearings and their associated structure is effectuated by applying a surface energy lowering coating to selected portions of the bearing other than the surface tension seal producing gaps thereof prior to a lubricant fluid fill. The coating system and method of the present invention may also advantageously be utilized to produce a secondary barrier seal extending a relatively short distance within and adjoining the opening of the surface tension seal producing gaps.

16 Claims, 2 Drawing Sheets

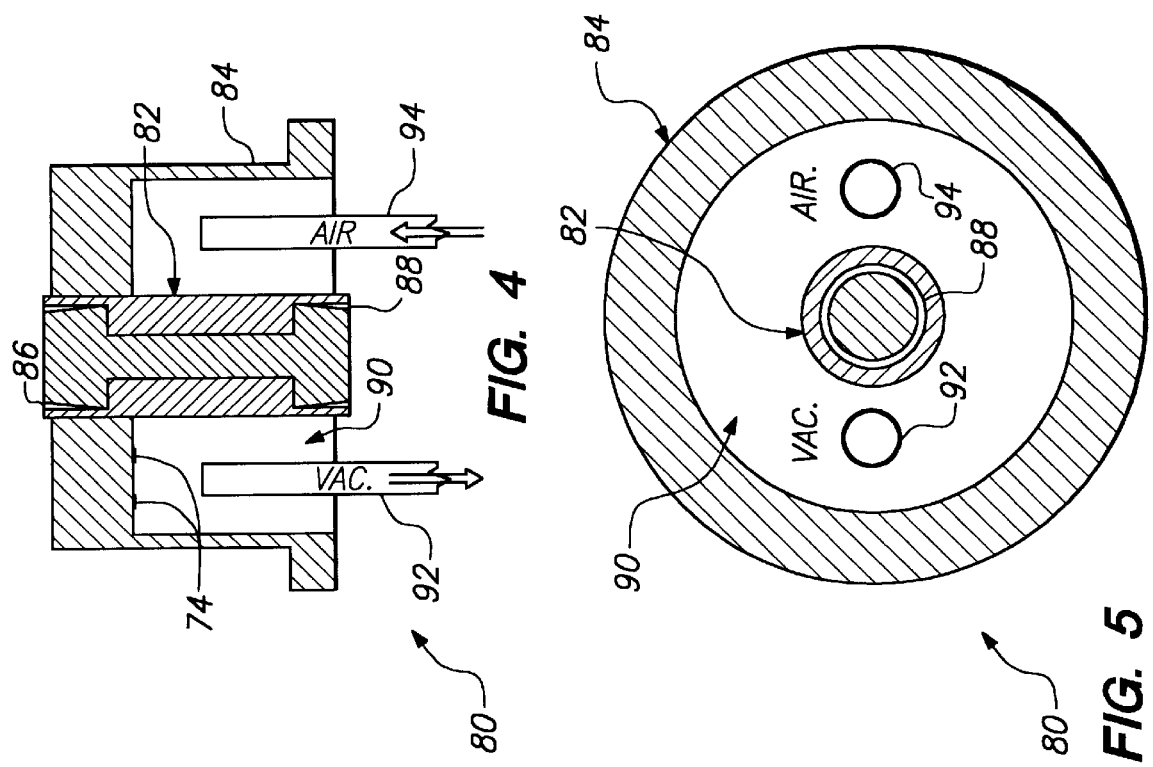
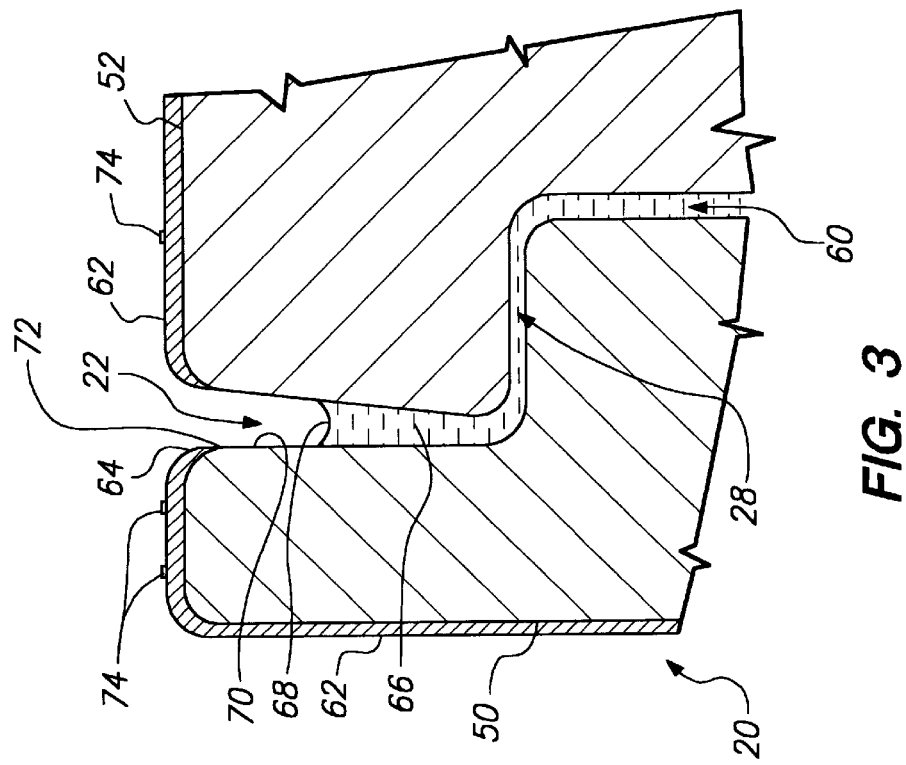

COATING SYSTEM AND METHOD FOR FILLING OF A HYDRODYNAMIC BEARING AND A SECONDARY SEAL STRUCTURE MADE THEREBY

This application is a division of application Ser. No. 08/437,995, filed May 9, 1995, abandoned Nov. 22, 1996.

CROSS REFERENCE TO RELATED PATENTS

The present invention is related to the subject matter of U.S. Pat. No. 4,795,275 for "Hydrodynamic Bearing" issued Jan. 3, 1989; U.S. Pat. No. 5,067,528 for "Hydrodynamic Bearing" issued Nov. 26, 1991; and U.S. Pat. No. 5,112,142 for "Hydrodynamic Bearing" issued May 12, 1992, all issuing to Digital Equipment Corporation and now assigned to Quantum Corporation, Milpitas, Calif., assignee of the present invention. The present invention is also related to the subject matter of U.S. patent applications Ser. No. 08/388,380 filed Feb. 14, 1995 for "Hydrodynamic Bearing Having Inverted Surface Tension Seals" and Ser. No. 08/363,566 filed Dec. 22, 1994 for "Self-Contained Hydrodynamic Bearing Unit", both also assigned to Quantum Corporation. The disclosures of the foregoing patents and patent applications are hereby specifically incorporated herein by this reference.

BACKGROUND OF THE INVENTION

The present invention relates, in general, to the field of hydrodynamic bearings and the manufacture thereof. More particularly, the present invention relates to a coating system and method for facilitating the cleaning of hydrodynamic bearings and their associated structure by applying a surface energy lowering coating to selected portions of the bearing other than substantially within the surface tension seal producing gaps thereof prior to a lubricant fill. The coating system and method of the present invention may also advantageously be utilized to produce a secondary barrier seal extending a relatively short distance into and adjoining the opening of the surface tension seal producing gaps.

Hydrodynamic bearings offer significant advantages over conventional ball bearings in a number of applications, particularly with respect to the rotation of one or more storage media concentrically affixed to a central hub about a disk drive spindle. The aforementioned United States patents describe the advantages and structure of a typical hydrodynamic bearing comprising a central shaft (or journal), axially disposed thrust plates and a surrounding sleeve having an intermediate lubricating fluid contained therein to allow relative motion between the shaft and sleeve. A preferred method of filling a hydrodynamic bearing with the lubricating fluid is also described therein comprising, inter alia, the steps of placing the bearing in a vacuum above the lubricant, submerging the bearing in the lubricant and then, while remaining fully submerged in the lubricant, exposing the system to atmospheric pressure.

In some instances, it has been suggested that a non-wetting, or surface energy reducing coating may then be applied to the outer edges of the bearing seals following the lubricant fluid fill to help deter lubricant from escaping from the seals. Utilizing this technique however, extreme care must be exercised in the application of the coating and the selection of the areas to which it is applied to avoid contamination of the lubricant. The surface energy of the metal surface of the bearing is also much higher than the typical lubricant oil, making removal of excess lubricant from the metal surface very difficult, particularly without the continuing availability of effective solvents such as chlorofluorocarbons ("CFCs" e.g. Freon™). Alternative, environmentally acceptable solvents are not very effective in removing excess lubricant from the metal surface and with their use there is a remaining risk that the solvent will enter the bearing and contaminate the lubricant. As a result, this highly localized application of a non-wetting coating does not address the problems attendant removal of excess lubricating fluid from the external surfaces of the bearing following a filling operation.

SUMMARY OF THE INVENTION

In marked distinction, a particular embodiment of the present invention contemplates the selective application of a surface energy reducing coating, for example, a synthetic fluorine containing resin such as Teflon™ or a thin film barrier material which exhibits low surface energy and inhibits surface spread or migration of lubricating fluid such as NYEBAR™, to the entire outer surface of the hydrodynamic bearing prior to the lubricant fluid fill. As disclosed herein, the bearing may be set within a fixture which is operative to selectively occlude selected portions of the surface tension seal forming gaps allowing the outer bearing surfaces to be covered with the coating by spraying, immersion or other means while simultaneously preventing the coating from later contaminating the lubricant or otherwise interfering with the surface tension seal to be formed within the gap. By selective construction of the fixture-to-surface tension seal forming gap interface, the coating may also be allowed to extend a relatively short distance within the gap, but displaced from the surface tension seal itself, to provide a secondary barrier bead at the periphery of the gap to augment retention of the lubricant within the seals.

Broadly, what is disclosed is a hydrodynamic bearing including a centrally disposed shaft and a circumferentially surrounding sleeve for relative motion therebetween. The bearing further includes a void for retaining a lubricant fluid disposed intermediate the shaft and the sleeve wherein the lubricant fluid may form at least one surface tension seal within a gap communicating with an exterior surface of the shaft and the sleeve. The improvement comprises a surface energy reducing coating applied to the exterior surface of the shaft and the sleeve. In a particular embodiment, the coating, which may comprise a synthetic fluorine containing resin, extends at least partially within the gap displaced from the surface tension seal.

In accordance with the present invention there is disclosed a system and method for removing excess lubricant from the exterior surfaces of a hydrodynamic bearing having at least one surface tension seal forming gap disposed between a shaft and a circumferentially surrounding sleeve. The system comprises means for selectively occluding predetermined portions of the surface tension seal forming gap and means for applying a surface energy reducing coating to the exterior surfaces of the hydrodynamic bearing while the predetermined portions of the surface tension seal forming gap are occluded. The system further comprises means for filling the hydrodynamic bearing with a lubricant to produce a surface tension seal within the surface tension seal forming gap and means for removing excess areas of the lubricant from the exterior surfaces of the hydrodynamic bearing coated with the surface energy reducing coating.

BRIEF DESCRIPTION OF THE DRAWINGS

The aforementioned and other features and objects of the invention and the manner of attaining them will become more apparent and the invention itself will be best understood by reference to the following description of a preferred embodiment, taken in conjunction with the accompanying drawings, wherein:

FIG. 3 is a follow on, cross-sectional, side elevational view of the same portion of the hydrodynamic bearing of FIG. 2 with the fixture removed from the surface tension seal producing gap and the bearing being filled with a lubricant fluid following the application of a surface energy lowering coating illustrating the production of a secondary barrier bead displaced from the surface tension seal and excess lubricant adjoining the coating on the bearing outer surfaces;

FIG. 4 is a cross-sectional, side elevational view of a hydrodynamic bearing and a circumferentially surrounding hub comprising a portion of, for example, a disk drive spindle assembly wherein the bearing and hub are pressed or otherwise affixed to each other prior to a vacuum dip lubricant fill of the bearing illustrating the possible utilization of vacuum and air cannulae for removing excess lubricant fluid from the surface energy lowering coating covered outer surfaces thereof; and FIG. 5 is a bottom plan view of the hydrodynamic bearing and hub of FIG. 4.

DESCRIPTION OF A PREFERRED EMBODIMENT

Figure 1:
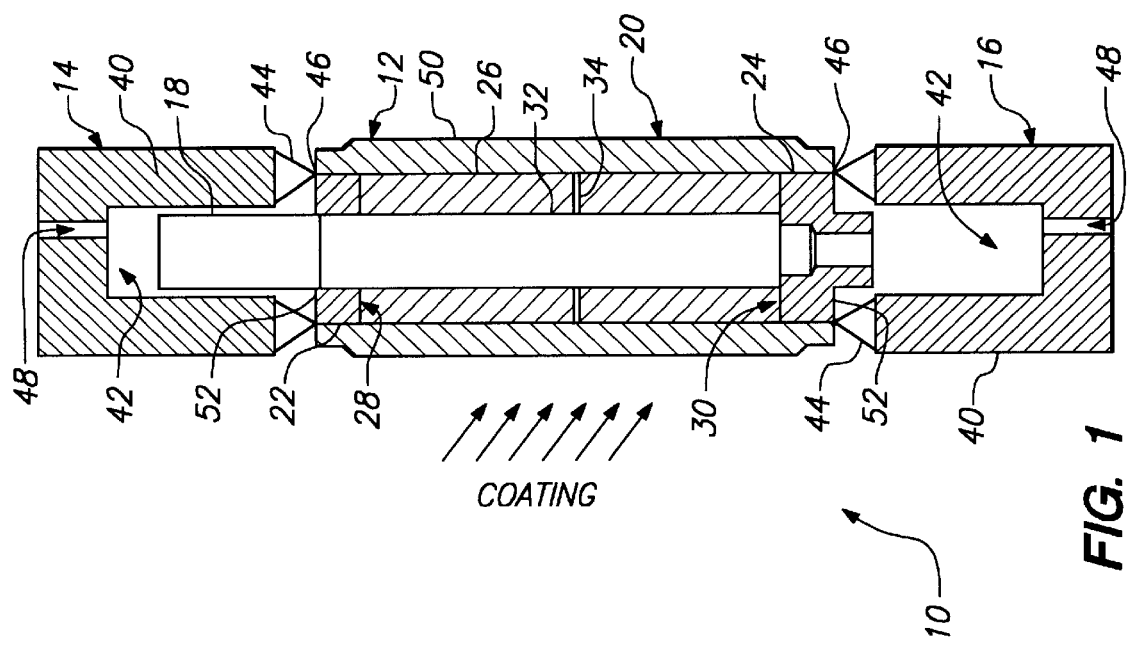
FIG. 1 is a cross-sectional, side elevational view of a coating system in accordance with the present invention for applying a surface energy lowering coating to selected portions of a typical hydrodynamic bearing utilizing a pair of fixtures for occluding selected portions of the surface tension seal producing gaps thereof prior to a lubricant fluid fill step.

With reference now to FIG. 1 one possible implementation of a coating system 10 in accordance with the present invention is shown wherein a surface energy reducing coating, for example, a synthetic fluorine containing resin such as Teflon™ or a thin film barrier material which exhibits low surface energy and inhibits surface spread or migration of lubricating fluid such as NYEBAR™, is sprayed or otherwise deposited onto the outer surfaces of a hydrodynamic bearing 12 other than within selected portions of the surface tension seal producing gaps thereof. The coating system 10 contemplates the utilization of first and second fixtures 14, 16 to selectively occlude selected portions of the surface tension seal forming gaps of the hydrodynamic bearing 12 prior to application of a surface energy reducing coating to the exterior surfaces of the bearing 12.

The hydrodynamic bearing 12, conventionally incorporates a central shaft or journal 18 and a circumferentially surrounding sleeve 20. First and second surface tension seal producing gaps 22, 24 allow formation of a surface tension seal to maintain a lubricant fluid between the shaft 18 and surrounding sleeve 20. In the embodiment illustrated, the sleeve 20 further includes a bushing 26 secured thereto or formed as a part thereof. First and second thrust plates 28, 30 adjoin the portions of the shaft 18 adjacent the ends of the sleeve 20. The first and second thrust plates 28, 30 may be formed as a portion of the shaft 18 or rigidly affixed thereto by other means. The bearing 12 also includes a void 32 for containing a lubricant fluid intermediate the shaft 18 and surrounding bushing 26 as well as one or more passageways 34 as described in the aforementioned United States patents.

The first and second fixtures 14, 16 comprise a cup-shaped member 40 having a concave cavity 42 formed therein to adjoin the opposing ends of the shaft 18 of the bearing 12. The members 40 are urged toward the ends of the bearing 12 and held in position with respect thereto and are later retracted from the bearing 12 following the application of the surface energy reducing coating as will be more fully described hereinafter. The members 40 further include an annular extension 44 having a distal ridge 46 formed thereon for insertion within the first and second surface tension seal producing gaps 22, 24 as shown. In the embodiment illustrated, the first and second fixtures 14, 16 also include a channel 48 which communicates with the concave cavity 42 to allow application of the surface energy reducing coating to the portions of the bearing adjoining the ends of the shaft 18 and first and second thrust plates 28, 30. By means of the channel 48, the coating may be applied to the thrust plate outer surfaces 52 in addition to the sleeve outer surfaces 50 not covered by the first and second fixtures 14, 16.

Although not illustrated, it is within the contemplation of the invention that the fixtures 14, 16 include channels extending through the annular extension 44 and distal ridge 46 to enable a lubricant fluid to be applied to the first and second surface tension seal producing gaps 22, 24 to effectuate a lubricant fill operation of the bearing 12 in addition to providing the selective occlusion of the first and second surface tension seal producing gaps 22, 24 as disclosed herein.

Figure 2:
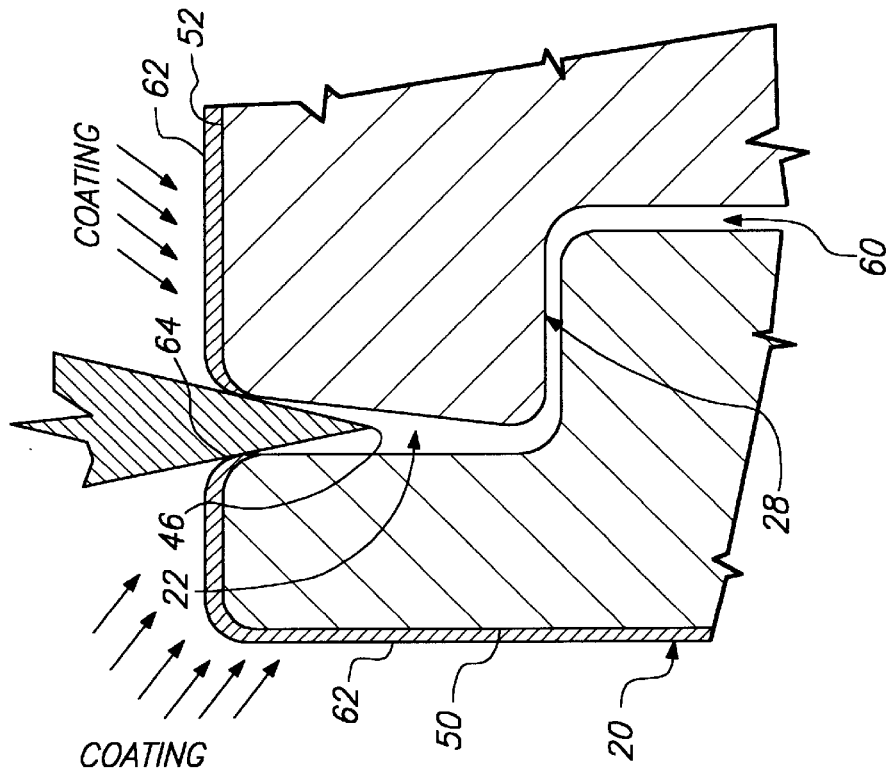
FIG. 2 is an enlarged cross-sectional, side elevational view of a portion of the hydrodynamic bearing of FIG. 1 illustrating the insertion of a distal ridge extending from an annular extension of a fixture within a surface tension producing gap of the bearing as a surface energy lowering coating is applied, for example, by spraying on the outer surfaces thereof.

With reference additionally now to FIG. 2, a more detailed view of the coating system 10 of the present invention is shown. In this illustration, the lubricant void 60 intermediate the sleeve 20 and shaft 18 (including the first thrust plate 28) is shown. The lubricant void 60 will be filled with a lubricant fluid following the deposition of the surface energy reducing coating 62 as shown. As shown, the annular extension 44, which includes the distal ridge 46, extends within the first surface tension seal producing gap 22 to selectively occlude portions of the gap prior to application of the coating 62 when the first fixture 14 is urged toward engagement with the bearing 12. The coating 62 may be applied by spraying, immersion or other deposition technique to effectuate its adherence to the outer surfaces of the bearing including the sleeve outer surface 50 and the thrust plate outer surface 52. By selectively determining the shape of the physical interface between the annular extension 44 and distal ridge 46 with the first surface tension seal producing gap 22, a secondary barrier bead 64 comprising the coating 62 may also be formed which extends a relatively short distance within the first surface tension seal producing gap 22 as will be further illustrated hereinafter.

With reference now to FIG. 3, the portion of the bearing 12 illustrated in FIG. 2 is shown following withdrawal of the first fixture 14 from the bearing 12. As can be seen, a lubricant fluid 66 has been inserted within the lubricant void 60 to ultimately form a surface tension seal 68 within the first surface tension seal producing gap 22. The bearing 12 may be filled with the lubricant fluid 66 through a number of techniques including a vacuum/immersion technique as well as through the use of the fixtures 14, 16 as previously described.

The surface tension seal 68 extends partially within the first surface tension seal producing gap 22 leaving a gap sidewall 70 extending up to the gap/bead interface 72 adjoining the secondary barrier bead 64. The secondary barrier bead 64 extends a relatively short distance within the first surface tension seal producing gap 22 but is displaced from the surface tension seal 68 itself. In practice, it is possible that a small amount of the lubricant fluid 66 comprising a liquid film of on the order of only a few angstroms may adjoin the gap sidewall 70 despite the formation of the surface tension seal 68. In this instance, the secondary barrier bead 64 formed of the coating 62 will function to further preclude the escape of any of the lubricant fluid 66 from the first surface tension seal producing gap 22.

Through the use of the energy reducing coating technique herein disclosed, excess lubricant 74 which may partially adhere to the coating 62 will tend to bead up and roll off following the lubricant fluid 66 fill of the bearing 12. Any excess lubricant 74 which remains on the coated surfaces can be readily removed with a blast of air or by means of a vacuum suction applied adjacent the surface.

With reference additionally now to FIGS. 4 and 5, a system for removing excess lubricant 74 from the coated surfaces of a hydrodynamic bearing and associated structure is shown comprising a cleaning system 80. In this illustration, the cleaning system 80 is utilized in conjunction with a spindle 82 and circumferentially surrounding hub 84 as may be utilized, for example, as a spindle assembly for a computer mass storage disk drive. The hub 84 may be formed as a portion of the spindle 82 sleeve or otherwise rigidly affixed thereto through various techniques. The spindle 82 incorporates a hydrodynamic bearing having surface tension seals 86, 88 as previously described. The hub 84 presents a motor cavity 90 for retention of the various motor elements for electrically rotating the hub 84 about the shaft of the spindle 82.

In this exemplary illustration of a cleaning system 80, the bearing portion of the spindle 82 is filled with a lubricant fluid while the same is affixed to the hub 84. This may, therefore, result in excess lubricant 74 adhering to various surfaces of the hub as well when the bearing is filled in a vacuum immersion process for example. Since the outer surfaces of the hub 84 may also have been previously coated with the surface energy reducing coating as described above, the excess lubricant 74 can be removed by a suction force applied through a vacuum cannula 92 in conjunction with, or in lieu of, a blast of air applied through an air cannula 94. Of course, the excess lubricant 74 may also be removed by wiping, such as with a clean rag or the like.

In a preferred embodiment, the coating 62 may be a surface energy reducing coating, for example, a synthetic fluorine containing resin such as Teflon™ dissolved or suspended in a solvent. When applied to the sleeve outer surface 50, thrust plate outer surface 52 or the outer surfaces of the associated structure such as a hub 84, the solvent evaporates leaving a relatively thin layer of the surface energy reducing agent. An alternative preferred material is a thin film barrier material which exhibits low surface energy and inhibits surface spread or migration of the lubricating fluid. One example is available under the brand name NYEBAR™. Inasmuch as most liquids tend to adhere to surfaces with high energy, liquids such as the lubricant fluid will tend to bead up on the non-wetting, surface energy reducing agent applied to the exterior surfaces of the bearing 12. The use of the first and second fixtures 14, 16 exposes only the exterior areas of the bearing 12 or hub 84 intended to be coated with the coating 62.

After the coating 62 has dried on the exterior surfaces of the bearing 12 and any associated structure such as the hub 84, a curing step may be effectuated by means of baking the structure at an elevated temperature for a predetermined period of time. In the event a baking step is desired, the baking process can take place either prior to or after removal of the first and second fixtures 14, 16 from engagement with the hydrodynamic bearing 12. In addition to a blast of air through an air cannula 94 or suction through a vacuum cannula 92, any excess lubricant 74 which might still remain on the surface may be removed by adding a small amount of solvent to the air blast to help absorb the excess lubricant 74.

While there have been described above the principals of the present invention in conjunction with specific apparatus, it is to be clearly understood that the foregoing description is made only by way of example and not as a limitation to the scope of the invention. Particularly, it should be recognized that the principals of the invention are likewise applicable to hydrodynamic bearings having one or more inverted surface tension seals as described in the aforementioned United States patent application Ser. No. 08/388,380, filed Feb. 14, 1995. Moreover, although the surface tension seal producing gaps shown herein have been illustrated as tapered gaps, they may also comprise linear or non-linear gaps effective for producing surface tension seals which function to maintain the lubricant fluid within the hydrodynamic bearing. In particular situations, it may also be advantageous to coat the various piece parts comprising the hydrodynamic bearing prior to their assembly together and still realize the advantages of the surface energy lowering coating and secondary barrier seal herein disclosed.

What is claimed is:

1. A system for filling lubricant into a hydrodynamic bearing having at least one surface tension seal forming gap disposed between a shaft and a circumferentially surrounding sleeve, said system comprising:

means for selectively occluding predetermined portions of said surface tension seal forming gap;

means for applying a surface energy reducing coating to said exterior surfaces of said hydrodynamic bearing, before filling said hydrodynamic bearing with said lubricant, while said predetermined portions of said surface tension seal forming gap are occluded;

means for filling said hydrodynamic bearing with the lubricant to form a surface tension seal within said surface tension seal forming gap; and means for removing excess areas of said lubricant from said exterior surfaces of said hydrodynamic bearing coated with said surface energy reducing coating.

2. The system of claim 1 wherein said occluding means comprises a fixture having an annular distal ridge for insertion within said surface tension seal forming gap.

3. The system of claim 1 wherein said applying means comprises a surface energy reducing coating dip.

4. The system of claim 1 wherein said applying means comprises a surface energy reducing coating spray.

5. The system of claim 1 wherein said filling means comprises a vacuum aided lubricant dip of said bearing.

6. The system of claim 1 wherein said removing means comprises an air blast directed toward said excess lubricant.

7. The system of claim 1 wherein said surface energy reducing coating comprises a synthetic fluorine containing resin.

8. A process for filling lubricant into a hydrodynamic bearing having at least one surface tension seal forming gap disposed between a shaft and a circumferentially surrounding sleeve, said process comprising the steps of:

selectively occluding predetermined portions of said surface tension seal forming gap;

applying a surface energy reducing coating to said exterior surfaces of said hydrodynamic bearing while said predetermined portions of said surface tension seal forming gap are occluded;

filling said hydrodynamic bearing with the lubricant to produce a surface tension seal within said surface tension seal forming gap; and removing excess lubricant from said exterior surfaces of said hydrodynamic bearing coated with said surface energy reducing coating.

9. The process of claim 8 wherein said step of occluding is carried out by a fixture having an annular distal ridge for insertion within said surface tension seal forming gap.

10. The process of claim 8 wherein said step of applying is carried out by means of a synthetic fluorine containing resin.

11. The process of claim 10 wherein said step of applying is carried out by dipping said bearing in said synthetic fluorine containing resin.

12. The process of claim 10 wherein said step of applying is carried out by spraying said bearing with said synthetic fluorine containing resin.

13. The process of claim 8 wherein said step of filling is carried out by a vacuum aided lubricant dip of said bearing.

14. The process of claim 8 wherein said step of removing is carried out by an air blast directed toward said excess lubricant.

15. The process of claim 8 wherein said step of removing is carried out by vacuuming said excess lubricant from said exterior surfaces.

16. The process of claim 8 further comprising the step of:

baking said coating to said exterior surfaces of said hydrodynamic bearing prior to said step of removing.

* * * * *